United States Patent [19]

Barker et al.

[11] Patent Number: 5,075,675
[45] Date of Patent: Dec. 24, 1991

[54] METHOD AND APPARATUS FOR DYNAMIC PROMOTION OF BACKGROUND WINDOW DISPLAYS IN MULTI-TASKING COMPUTER SYSTEMS

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 213,423

[22] Filed: Jun. 30, 1988

[51] Int. Cl.$^5$ .............................................. G06F 3/14
[52] U.S. Cl. .................................. 340/721; 340/723; 364/286.2; 364/286.3; 364/927.63; 364/927.631; 364/521; 364/DIG. 2; 395/157
[58] Field of Search ............... 340/721, 723, 747, 750, 340/724, 734; 364/518, 521, 200, 900, 200 MS File, 900 MS File

[56] References Cited

U.S. PATENT DOCUMENTS

| | | | |
|---|---|---|---|
| 4,070,710 | 1/1978 | Sukonick et al. | 364/900 |
| 4,533,910 | 8/1985 | Sukonick et al. | 364/521 |
| 4,542,376 | 9/1985 | Bass et al. | 364/521 |
| 4,555,775 | 11/1985 | Pike | 364/900 |
| 4,642,790 | 2/1987 | Minshull et al. | 364/900 |
| 4,651,146 | 3/1987 | Lucash et al. | 340/750 |
| 4,670,752 | 6/1987 | Marcoux | 340/721 |
| 4,688,167 | 8/1987 | Agarwal | 364/200 |
| 4,694,288 | 9/1987 | Harada | 340/724 |
| 4,731,745 | 3/1988 | Katagiri et al. | 364/560 |
| 4,736,309 | 4/1988 | Johnson et al. | 364/521 |
| 4,761,642 | 8/1988 | Huntzinger | 364/521 |
| 4,780,710 | 10/1988 | Tatsumi | 340/721 |
| 4,783,648 | 11/1988 | Homma et al. | 340/724 |
| 4,806,919 | 2/1989 | Nakayama et al. | 340/721 |
| 4,819,189 | 4/1989 | Kikuchi et al. | 340/723 |
| 4,829,294 | 5/1989 | Iwami et al. | 364/521 |
| 4,860,218 | 8/1989 | Sleator | 364/521 |
| 4,890,098 | 12/1989 | Dawes et al. | 340/721 |
| 4,890,257 | 12/1989 | Anthias et al. | 364/900 |
| 4,954,818 | 9/1990 | Nakane et al. | 340/721 |

Primary Examiner—Thomas C. Lee
Assistant Examiner—Mehmet Geckil
Attorney, Agent, or Firm—Andrew J. Dillon

[57] ABSTRACT

A method and apparatus are disclosed for dynamically promoting a selected background window displayed on a computer system among a plurality of windows which at least partially overlap the background window. The output of data from the selected background window is monitored and is utilized to selectively provide an unencumbered display by altering the display sequence of the windows to automatically promote the background window to the uppermost display position, in accordance with the state of a display attribute associated with the background window. After the output of data by the selected window has occurred, the display attribute may be utilized to determine whether or not the selected window returns to its previous display position or remains in the uppermost display position.

7 Claims, 3 Drawing Sheets

METHOD AND APPARATUS FOR DYNAMIC PROMOTION OF BACKGROUND WINDOW DISPLAYS IN MULTI-TASKING COMPUTER SYSTEMS

BACKGROUND OF THE INVENTION

1. Technical Field

This invention relates in general to methods for the efficient utilization of multiple computer applications in a multi-tasking system and in particular to methods which permit the output of one application to selectively alter the sequence of the display of a plurality of overlapping windows displaying the multiple computer applications. Still more particularly, the present invention relates to a method whereby a user may elect to assign a priority to the output of a selected application, such that the window in which the application is displayed will automatically be promoted to an uppermost display position in response to the outputting of data from that application.

2. Background Art

It is possible with modern computer systems for a computer to simultaneously execute several software applications. The execution of multiple applications simultaneously is often referred to as "multi-tasking." It is also possible for multiple interactive work stations to be linked to a host computer whereby a user may simultaneously execute several software applications by utilizing a work station and the host computer. It is desirable in such environments to allow the user to view some or all of the applications simultaneously. This is often accomplished by the utilization of the concept of "windows" wherein all or part of multiple applications are displayed in separate viewports or "windows" of a computer system video display system. The complexity of many software applications require substantially all of a computer's video display and it is therefore common to overlay one window upon another window, or to represent a second application with a miniature graphic representation or "icon." Further, it is known to have multiple software applications present on a computer display simultaneously, one or more of which may be active at any given time, and which may be displayed in a window or icon.

As an example of the above, a user may desire to have three separate applications invoked each time the user starts up his or her computer system. A word processor program and a spread sheet may be initially displayed in windows on the display system while an electronic mail application is initially displayed as an icon at the bottom of the display. When the user desires to send or receive electronic mail to or from other computers connected to his or her computer via a computer network, the user must expand the icon into a window, send or receive the mail, and then shrink or "tokenize" the application into an icon once again.

A problem inherent in such multi-tasking systems is the inability of an interactive application to display a change in status while it is overlayed by another application or displayed in an icon status. Thus, if the above described user desires to spend most of his or her time working within a word processing or spread sheet environment, it will not be possible to determine whether or not incoming electronic mail has arrived or what type of mail is awaiting response. Certain known software applications which are utilized in a multi-tasking environment utilize a bell or tone to indicate a change in status of one application to the user. However, many software applications have multiple states of interest to the user which may not be indicated by an audio tone. For example, an application may require an input from a user, the application may indicate that execution is taking place or has concluded, or the application may indicate an error state.

One known solution for this problem has recently been proposed which utilizes a miniature graphic representation or "icon" which is indicative of an individual computer task. This icon is defined or characterized by a set of graphic parameters which may include color, textual content and duration. A change in the status of a first computer task is then indicated by a variation in one or more of the graphic parameters. For example, the color or graphic content of the icon may be altered, or the icon may be turned off or "blinked" to indicate a specific change in status.

While this proposal represents an advance in the art, it is only useful for indicating a change of status of an application which has been tokenized or turned into an icon and, after the changed state has been indicated, it is still necessary for the user to deactivate the application in which he or she is currently working and activate the tokenized computer application. Additionally, this proposed system may not be utilized in a situation wherein the computer application program is displayed within a window which is overlapped by a second active application.

Of course, those skilled in the art will appreciate that known systems exist whereby messages from the system operator may take precedence over an active application and be displayed for the utilization of a user. However, no method exists whereby the outputting of data from one application may be automatically utilized to alter the display sequence of a plurality of overlapped windows whereby a user may be automatically and dynamically made aware of the output of data by an overlapped application by the promotion of that application to the uppermost display position.

Therefore, it should be obvious that a need exists for a method whereby the output of data from an application displayed in an overlapped window may be utilized to automatically promote that window to an uppermost display system so that a user may be aware of the output data without the necessity of activating the second application.

SUMMARY OF THE INVENTION

It is therefore one object of the present invention to provide an improved method for the efficient utilization of multiple computer applications.

It is another object of the present invention to provide an improved method for the efficient utilization of multiple computer applications in a multi-tasking system wherein the applications are displayed in a plurality of overlapping windows.

It is yet another object of the present invention to provide an improved method for the efficient utilization of multiple computer applications in a multi-tasking system wherein the output of data from a selected application may dynamically actuate a background window.

The foregoing objects are achieved as is now described. The method of the present invention may be utilized to dynamically actuate a selected background window which is displayed on a computer system among a plurality of windows which at least partially overlap the background window. The output of data from the selected background window is monitored and is utilized to selectively provide an unencumbered display by altering the display sequence of the windows to automatically promote the background window to the uppermost display position, in accordance with the state of a display attribute associated with the background window. After the output of data by the selected window has occurred, the display attribute is utilized to determine whether or not the selected window returns to its previous display position or remains in the uppermost display position.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
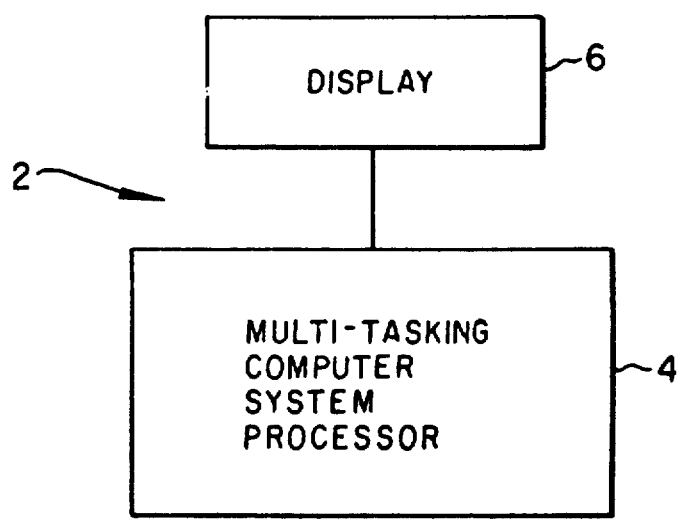
FIG. 1 is a block diagram of a computer system which may be utilized with the method of the present invention.
Figure 2:
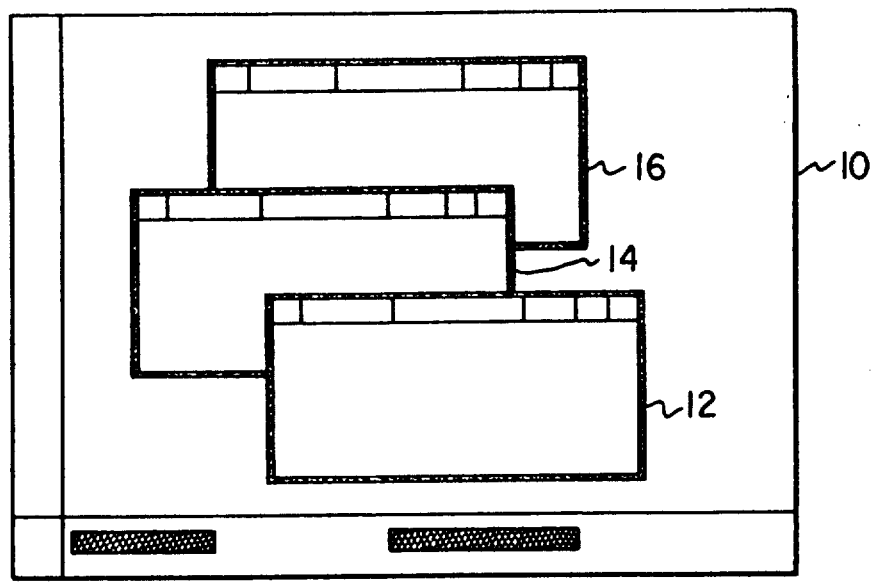
FIG. 2 is a pictorial representation of a plurality of windows displayed on a computer display screen.

With reference now to the figures and in particular with reference to FIG. 1, there is depicted a block diagram of a computer system 2 which includes a multi-tasking computer system processor 4 coupled to a display 6, which may be utilized to implement the method of the present invention. Referring now to FIG. 2, there is depicted a pictorial representation of a computer display screen 10 upon which are displayed a plurality of overlapping windows 12, 14, and 16. As those skilled in the art will appreciate, windows 12, 14, and 16 are typically overlapped in a sequence which is dependent upon the order in which the windows were called or opened. That is, window 16 was opened and thereafter the opening of window 14 caused window 14 to overlap window 16. Next, window 12 was opened, overlapping window 14. Of course, each window may display a different computer application program. That is, window 16 may display a spread sheet program, window 14 may display a word processing program and window 12 may display a graphics application.

In accordance with the method of the present invention, each window displayed within computer display screen 10 includes a display attribute associated therewith which may be utilized to control the selective alteration of the display sequence in accordance with the output of data from a designated application. For example, a user may make a request for data from a database application and return to a word processing application wherein it is desired to incorporate that data. When the data requested has been obtained, if the display attribute associated with that window permits, the database application will selectively alter the sequence of displayed windows to permit the database application to be displayed in the uppermost display position.

Figure 3:
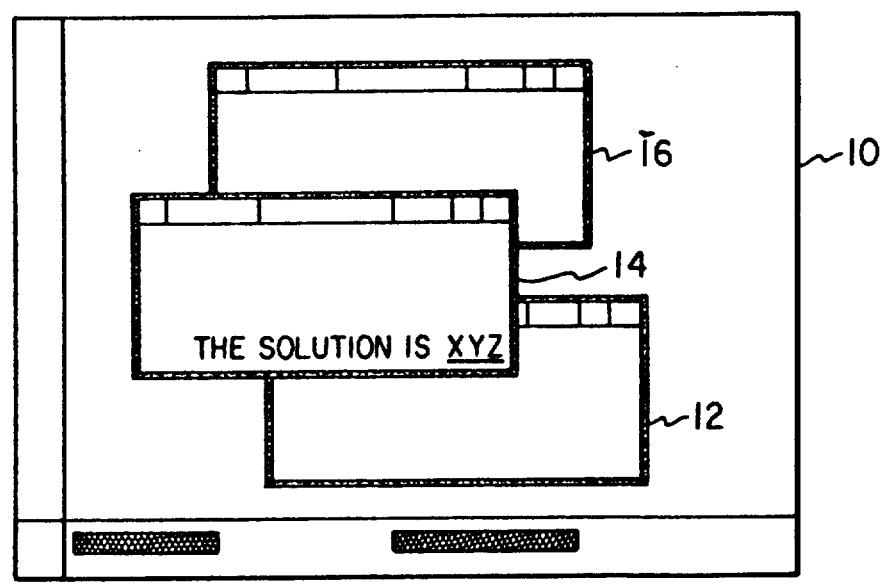
FIG. 3 is a pictorial representation of the plurality of windows of FIG. 1 after selective alteration of the display sequence has occurred in accordance with the method of the present invention.

Referring now to FIG. 3, a pictorial representation of the plurality of windows displayed within computer display screen 10 is illustrated, after a selective alteration of the display sequence has occurred in accordance with the method of the present invention. As can be seen, the generation of output data, "The solution is XYZ" has caused a selective alteration in the displayed sequence of windows 12, 14, and 16. As is illustrated, window 14 has been "promoted" to the uppermost display position, overlapping windows 12 and 16. This action has occurred dynamically, in accordance with the state of a display attribute associated with window 14 and the occurrence of the output of data from the application displayed therein. The display attribute associated with window 14 in the depicted embodiment permits the alteration of the display status of window 14 as a result of the output of data from the application, as depicted in FIG. 3.

Figure 4:
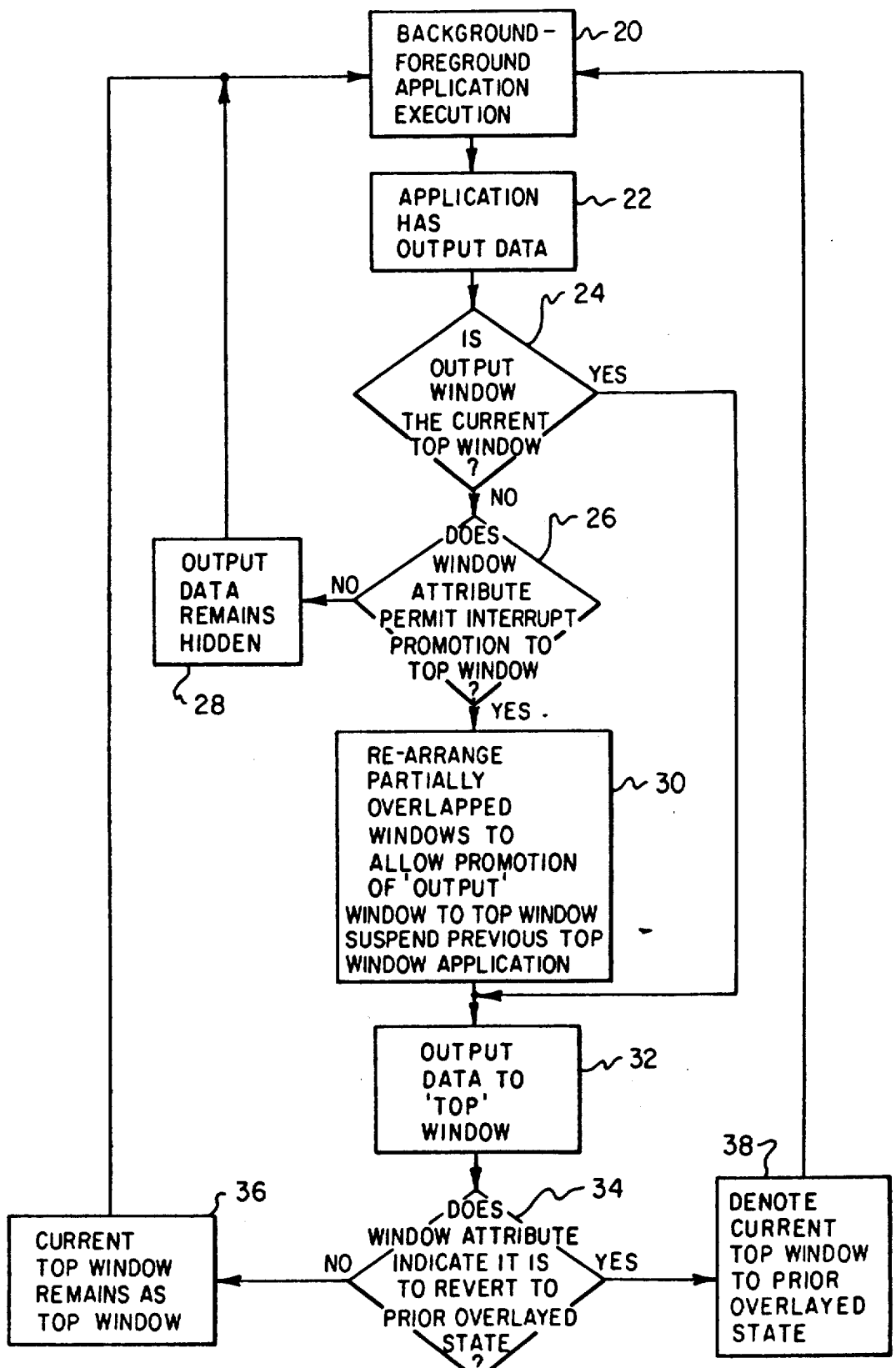
FIG. 4 is a logic flow chart of the method of the present invention.

With reference now to FIG. 4, there is depicted a logic flow diagram illustrating the method of the present invention. As may be seen, the process begins at block 20 with both background and foreground applications executing programs in a multi-tasking system wherein the applications are displayed in a plurality of windows which at least partially overlap in a selected sequence. Block 22 illustrates the occurrence of the generation of output data in a selected one of the applications currently executing. Thereafter, block 24 depicts the determination of whether or not the application generating the output data is the current "top" window, or the window in the uppermost display position. If so, the output data is displayed in the appropriate window, as illustrated in block 32.

In the event the application generating the output data is not the uppermost window, block 26 illustrates the determination of whether or not the display attribute associated with that window permits the interrupt promotion of that window to the uppermost display position. If not, block 28 depicts the output data remaining obscured and the program returns to the execution states illustrated in block 20. Where the display attribute associated with the window attempting to output data permits the interrupt promotion of that window to an uppermost display position, block 30 depicts the position of an unencumbered display by the selective alteration or rearrangement of the overlapped windows to promote the "output" window to the uppermost display position and the suspension of the activity of the previous "top" window application. Next, the output data is displayed, as depicted in block 32.

After the display of output data has occurred, block 34 illustrates a determination of whether or not the display attribute associated with the output window indicates that the window in question must revert to its previous overlapped state. If not, block 36 indicates that the altered display sequence will remain intact and the program will return to block 20 and continue execution. If revision of the display sequence is indicated by the display attribute, block 38 depicts the demotion of the uppermost displayed window to its prior overlapped state. Thereafter, the program returns to the execution status illustrated by block 20.

In accordance with the method of the present invention, a novel display attribute associated with selected windows in a multi-tasking system is utilized to permit the dynamic promotion of an overlapped window to an uppermost display position in response to the output of data by the application displayed within that window. Further, the alteration of the display sequence may be retained or reverted in accordance with a second aspect of the novel display attribute of the present invention. In this manner, a user may selectively operate in one application while waiting for output data from a second application without the necessity of periodically entering the second application to determine the status thereof.

While the invention has been particularly shown and described with reference to a preferred embodiment, it will be understood by those skilled in the art that various changes in form and detail may be made therein without departing from the spirit and scope of the invention.

We claim:

1. A method in a multi-tasking computer system having a processor for executing a plurality of computer application programs which are simultaneously active and displayed in a plurality of windows which at least partially overlap in a selected order, of dynamically promoting a selected one of said plurality of windows to a topmost position, said method comprising the steps of:

utilizing said processor to monitor a particular one of said plurality of computer application programs displayed within said selected one of said plurality of windows to detect an output of data from said particular one of said plurality of computer application programs wherein said selected one of said plurality of windows is at least partially overlapped; and automatically promoting said selected one of said plurality of windows to a topmost position without user intervention in response to said detection of an output of data from said particular one of said plurality of computer application programs.

2. The method in a multi-tasking computer system having a plurality of computer application programs which are simultaneously active and displayed in a plurality of windows which at least partially overlap in a selected order, of dynamically promoting a selected one of said plurality of windows to a topmost position according to claim 1, wherein said step of automatically promoting said selected one of said plurality of windows to a topmost position is accomplished by selectively altering said selected order.

3. The method in a multi-tasking computer system having a plurality of computer application programs which are simultaneously active and displayed in a plurality of windows which at least partially overlap in a selected order, of dynamically promoting a selected one of said plurality of windows to a topmost position according to claim 2, further including the step of reverting said display of said plurality of windows to said selected order in response to a conclusion of said output of data from said particular one of said plurality of computer application programs.

4. The method in a multi-tasking computer system having a plurality of computer application programs which are simultaneously active and displayed in a plurality of windows which at least partially overlap in a selected order, of dynamically promoting a selected one of said plurality of windows to a topmost position according to claim 2, further including the step of maintaining said selected one of said plurality of windows in a topmost position until an output of data occurs from a second one of said plurality of computer application programs.

5. The method in a multi-tasking computer system having a plurality of computer application programs which are simultaneously active and displayed in a plurality of windows which at least partially overlap in a selected order, of dynamically promoting a selected one of said plurality of windows to a topmost position according to claim 1, further including the step of establishing a display attribute for each of said plurality of windows and wherein said step of automatically promoting said selected one of said plurality of windows to a topmost position in response to an output of data from said particular one of said plurality of computer application programs is controlled by said display attribute.

6. A multi-tasking computer system for use in processing a plurality of computer application programs which are simultaneously active within said multi-tasking computer system, said multi-tasking computer system comprising:

display means for displaying each of said plurality of computer application programs within a different one of a plurality of windows which at least partially overlap in a selected order;

processor means coupled to said display means for monitoring a particular one of said plurality of computer application programs displayed within a selected one of said plurality of windows to detect an output of data from said particular one of said plurality of computer application programs wherein said selected one of said plurality of windows is at least partially overlapped; and display control means coupled to said processor means for automatically promoting said selected one of said plurality of windows to a topmost position in response to said detection of an output of data from said particular one of said plurality of computer application programs.

7. The multi-tasking computer system for use and processing a plurality of computer application programs which are simultaneously active within said multi-tasking computer system according to claim 6, wherein said display control means further includes means for reverting said display of said plurality of windows to said selected order in response to a conclusion of said output of data from said particular one of said plurality of computer application programs.

* * * * *